United States Patent Office 3,164,892

Patented Jan. 12, 1965

3,164,892

THERMOELECTRIC BODY AND METHOD OF MAKING SAME

Martin Lieberman, Newark, and Allan S. Gelb, Irvington, N.J., assignors to General Instrument Corporation, Newark, N.J., a corporation of New Jersey No Drawing. Filed Nov. 27, 1962, Ser. No. 240,433
20 Claims. (Cl. 29—182.5)

The present invention relates to a thermoelectric body of novel composition which is in many respects superior in thermoelectric characteristics to, and which may be more readily manufactured than, prior art comparable devices. More specifically, it relates to a p-type thermoelectric body including silicon and germanium among its constituents.

Thermoelectric bodies formed of germanium and silicon are known. One major drawback to their more extensive use is the difficulty involved in manufacturing on a production scale bodies of this type which have adequate thermoelectric properties. Thus today the primary method for the manufacture of p-type silicon-germanium thermoelectric bodies is through the use of a single pass zone levelling technique which produces a body which must thereafter be subjected to cutting and shaping operations in order to form a useable device. This procedure is clearly not adaptable to mass production.

Powder metallurgy techniques have been utilized in the thermoelectric field, but the known germanium-silicon compositions (which often include, in addition to silicon and germanium, other substances) have not proved adaptable to such fabricating techniques.

We have discovered that p-type germanium-silicon thermoelectric bodies can be formed by powder metallurgy techniques, and in particular by the use of sintering, and that the products produced are not only more readily fabricated than prior p-type germanium-silicon thermoelectric materials, but are also superior to such prior art materials in several important thermoelectric respects. More specifically, we have found that when aluminum is added to a mixture of germanium and silicon, all of the substances being in particulate form, and the mixture is then sintered, and preferably subjected to a double sintering process, the desired results are obtained. The aluminum constitutes the "doping" constituent, but may be present in amounts significantly greater than is usually the case with "doping" substances. Indeed, the amount of aluminum preferably present would be expected to render the resultant composition electrically highly conductive, and hence non-thermoelectric, but surprisingly, such is not the case.

To the accomplishment of the above, and to such other objects as may hereinafter appear, the present invention relates to the composition of a thermoelectric body, and to the method of making the same, as defined in the appended claims and as described in this specification.

The fabrication of the thermoelectric elements of the present invention utilizes as starting materials the constituent substances—germanium, silicon and a doping material—in particulate form. The doping material, for the formation of p-type thermoelectric bodies, is here specifically disclosed as aluminum. While the particle size of the starting components may vary widely, and does not appear to be particularly critical, it is preferred that the particles be smaller than 20 mesh and larger than 325 mesh, with sizes close to 100 mesh apparently giving superior results.

The comminuted starting constituents are thoroughly mixed together in any appropriate manner. The doping material (aluminum) is present in amounts between 1 and 15%, and preferably on the order of 10%, by weight of the total active constituents. The relative proportions of silicon and germanium may also be varied widely. The relative ratio by weight of silicon to germanium preferably lies between 7:3 and 4.5:5.5, with proportions close to 7:3 apparently giving superior results.

After the comminuted starting materials have been thoroughly mixed they are placed in a suitable chamber, such as a glass tube, in a non-oxidizing environment. This environment is conveniently produced by evacuating the tube and then sealing it.

The mixed starting materials are then heated to an elevated temperature and maintained at that temperature for an appreciable period of time, the constituents thus being subjected to a sintering operation which, it is believed, gives rise to the production of the desired alloy form of the thermoelectric composition. Temperatures between 800° C. and 1200° C. are effective, with a temperature around 900° C. being preferred, this temperature being applied for a period of time preferably between 5 and 30 hours. At a temperature of 900° C. sintering for five hours has been found to be satisfactory.

At the close of the sintering operation the glass vessel in which the materials are contained is quenched in cold water, thus causing the sintered materials to solidify into an ingot. This ingot is removed from the glass vessel and is broken up and crushed into fine particles. Here again the specific particle size is not critical, although particles smaller than 20 mesh and larger than 325 mesh are preferred, with particles smaller than 20 mesh and larger than 50 mesh apparently giving best results.

An appropriate quantity of these particles are placed in an appropriate sized die and are pressure-compacted into pellets of desired size and shape. The compacting pressure is not critical, but pressures between 40,000 p.s.i. and 200,000 p.s.i. have given excellent results. Pressures on the order of 50,000 p.s.i. are preferred because they appear to be satisfactory and are at the low end of the preferred range.

The pellets thus produced are placed within a vessel, again in a non-oxidizing environment, which may be achieved by evacuating the vessel and then sealing it, and the pellets are then subjected to a second sintering operation, as by utilizing temperatures between 800° C. and 1200° C., and preferably 900° C., for a period of time between 24 hours and 500 hours, with a 100-hour period giving excellent results. Since a large number of pellets are treated at the same time, the duration of this second sintering step is not particularly disadvantageous from a production point of view. The pressure-compacting and second sintering operation appear to significantly improve the mechanical and thermoelectric properties of the finished product.

The resulting thermoelectric elements, as they come from the sintering operation, are essentially ready for use. Despite the fact that they contain a very substantial amount of dopant such as aluminum which is inherently conductive, the thus produced bodies do not exhibit metallic conductivity, but instead exhibit thermoelectric properties.

Bodies made according to the present invention have been compared with commercially available p-type germanium-silicon bodies sold by Radio Corporation of America and manufactured according to the zone levelling technique mentioned above. It has been found that the devices of the present invention exhibit superiority in many significant thermoelectric respects. Thus the devices made according to the present invention, and with a silicon-germanium ratio by weight of 7:3, when compared with RCA units have the same silicon-germanium ratio, exhibited a markedly lower electrical resistivity than the RCA units. Moreover, the resistivity of the units of the present invention remained more constant with changes in temperature than was tne case with the competitive units. The units of the present invention also exhibited a superior power number than the competitive units, and a greatly decreased thermal conductivity. The Seebeck coefficients of the units of the present invention were lower than those of the RCA devices, this being disadvantageous but not so much so as to overcome the other enumerated advantages. The Seebeck coefficient of the units of the present invention did not vary as much with temperature as did the corresponding characteristics of the RCA units, thus exhibiting another advantageous characteristic.

The fact that the devices of the present invention, by reason of the method by which they are prepared, lend themselves readily to mass production techniques, and hence lower manufacturing costs, would make them desirable and valuable even if they were not as effective from a thermoelectric point of view as competitive devices. The fact that, in addition to being readily manufactured on a quantity basis by means of powder metallurgy techniques, they also exhibit improved characteristics which are pertinent from a thermoelectric point of view, greatly emphasizes and enhances the significance of the present invention.

While but a limited number of embodiments of the present invention have been here specifically disclosed, it will be apparent that many variations may be made therein all within the scope of the instant invention as defined in the following claims.

We claim:

1. A thermoelectric composition consisting essentially of a sintered combination of germanium, silicon and aluminum, the aluminum being present in proportions between 1–15% by weight of the entire composition, the silicon and germanium being present in proportions by weight, relative to one another, between 7:3 and 4.5:5.5.

2. A thermoelectric composition consisting essentially of a sintered combination of particles of germanium, silicon and aluminum with grain sizes between 20 and 325 mesh, the aluminum being present in proportions between 1–15% by weight of the entire composition, the silicon and germanium being present in proportions by weight, relative to one another, between 7:3 and 4.5:5.5.

3. A thermoelectric composition consisting essentially of a sintered combination of particles of germanium, silicon and aluminum with grain sizes between 20 and 325 mesh, the aluminum being present in proportions on the order of 10% by weight of the entire composition, the silicon and germanium being present in proportions by weight of 7:3.

4. The method of making a thermoelectric body which comprises mixing particles of germanium, silicon and aluminum, the aluminum being present in proportions between 1–15% by weight of the entire composition, pressure-compacting said mixture, and sintering said mixture for an extended period of time and at an elevated temperature.

5. The method of making a thermoelectric body which comprises mixing particles of germanium, silicon and aluminum, the aluminum benig present in proportions between 1–15% by weight of the entire composition, said particles having grain sizes between 20 and 325 mesh, pressure-compacting said mixture, and sintering said mixture for an extended period of time and at an elevated temperature.

6. The method of making a thermoelectric body which comprises mixing particles of germanium, silicon and aluminum, the aluminum being present in proportions between 1–15% by weight of the entire composition, pressure-compacting said mixture under a pressure on the order of 40,000–200,000 p.s.i., and sintering said mixture for an extended period of time and at an elevated temperature.

7. The method of making a thermoelectric body which comprises mixing particles of germanium, silicon and aluminum, the aluminum being present in proportions between 1–15% by weight of the entire composition, pressure-compacting and mixture, and sintering said mixture for an extended period of time on the order of 24–500 hours and at an elevated temperature.

8. The method of making a thermoelectric body which comprises mixing particles of germanium, silicon and aluminum, the aluminum being present in proportions between 1–15% by weight of the entire composition, pressure-compacting and mixture, and sintering said mixture for an extended period of time and at an elevated temperature on the order of 800–1200° C.

9. The method of making a thermoelectric body which comprises mixing particles of germanium, silicon and aluminum, the aluminum being present in proportions between 1–15% by weight of the entire composition, pressure-compacting said mixture, and sintering said mixture for an extended period of time on the order of 24–500 hours and at an elevated temperature on the order of 800–1200° C.

10. The method of making a thermoelectric body which comprises mixing particles of germanium, silicon and aluminum, the aluminum being present in proportions between 1–15% by weight of the entire composition, pressure-compacting said mixture under a pressure on the order of 40,000–200,000 p.s.i., and sintering said mixture for an extended period of time on the order of 24–500 hours and at an elevated temperature on the order of 800–1200° C.

11. The method of making a thermoelectric body which comprises mixing particles of germanium, silicon and aluminum, the aluminum being present in proportions between 1–15% by weight of the entire composition, said particles having grain sizes between 20 and 325 mesh, pressure-compacting said mixture under a pressure on the order of 40,000–200,000 p.s.i., and sintering said mixture for an extended period of time on the order of 24–500 hours and at an elevated temperature on the order of 800–1200° C.

12. The method of making a thermoelectric body which comprising mixing particles of germanium, silicon and aluminum, the aluminum being present in proportions between 1–15% by weight of the entire composition, said particles having grain sizes between 20 and 325 mesh, pressure-compacting said mixture under a pressure on the order of 40,000–200,000 p.s.i., and sintering said mixture in a non-oxidizing atmosphere for an extended period of time on the order of 24–500 hours and at an elevated temperature on the order of 800–1200° C.

13. The method of making a thermoelectric body which comprises mixing particles of germanium, silicon and aluminum, the aluminum being present in proportions between 1–15% by weight of the entire composition, subjecting said mixture to a first sintering operation for a period of time on the order of five hours or more and at an elevated temperature, reducing said sintered product to small particles, pressure-compacting said particles into a formed body, and sintering said body for an extended period of time and at an elevated temperature.

14. The method of making a thermoelectric body which comprises mixing particles of germanium, silicon and aluminum, the aluminum being present in proportions between 1–15% by weight of the entire composition, subjecting said mixture to a first sintering operation in a non-oxidizing atmosphere for a period of time on the order of five hours or more and at an elevated temperature, reducing said sintered product to small particles, pressure-compacting said particles into a formed body, and sintering said body for an extended period of time and at an elevated temperature.

15. The method of making a thermoelectric body which comprises mixing particles of germanium, silicon and aluminum, the aluminum being present in proportions between 1–15% by weight of the entire composition, subjecting said mixture to a first sintering operation for a period of time on the order of five hours or more and at an elevated temperature on the order of 800–1200° C., reducing said sintered product to small particles, pressure-compacting said particles into a formed body, and sintering said body for an extended period of time and at an elevated temperature.

16. The method of making a thermoelectric body which comprises mixing particles of germanium, silicon and aluminum, the aluminum being present in proportions between 1–15% by weight of the entire composition, said particles having grain sizes between 20 and 100 mesh, subjecting said mixture to a first sintering operation for a period of time on the order of five hours or more and at an elevated temperature, reducing said sintered product to small particles having grain sizes between 20–100 mesh, pressure-compacting said particles into a formed body, and sintering said body for an extended period of time and at an elevated temperature.

17. The method of making a thermoelectric body which comprises mixing particles of germanium, silicon and aluminum, the aluminum being present in proportions between 1–15% by weight of the entire composition, said particles having grain sizes between 20 and 100 mesh, subjecting said mixture to a first sintering operation in a non-oxidizing atmosphere for a period of time on the order of five hours or more and at an elevated temperature on the order of 800–1200° C., reducing said sintered product to small particles having grain sizes between 20–100 mesh, pressure-compacting said particles into a formed body, and sintering said body in a non-oxidizing atmosphere for an extended period of time and at an elevated temperature.

18. The method of making a thermoelectric body which comprises mixing particles of germanium, silicon and aluminum, the aluminum being present in proportions between 1–15% by weight of the entire composition, subjecting said mixture to a first sintering operation for a period of time on the order of five hours or more and at an elevated temperature, reducing said sintered product to small particles, pressure-compacting said particles into a formed body under a pressure on the order of 40,000–200,000 p.s.i., and sintering said mixture for an extended period of time and at an elevated temperature.

19. The method of making a thermoelectric body which comprises mixing particles of germanium, silicon and aluminum, the aluminum being present in proportions between 1–15% by weight of the entire composition, subjecting said mixture to a first sintering operation for a period of time on the order of five hours or more and at an elevated temperature, reducing said sintered product to small particles, pressure-compacting said particles into a formed body, and sintering said body for an extended period of time on the order of 24–500 hours and at an elevated temperature on the order of 800–1200° C.

20. The method of making a thermoelectric body which comprises mixing particles of germanium, silicon and aluminum, the aluminum being present in proportions between 1–15% by weight of the entire composition, said particles having grain sizes between 20 and 100 mesh, subjecting said mixture to a first sintering operation for a period of time on the order of five hours or more and at an elevated temperature on the order of 800–1000 C., reducing said sintered product to small particles having grain sizes between 20–100 mesh, pressure-compacting said particles into a formed body, and sintering said body for an extended period of time on the order of 24–500 hours and at an elevated temperature on the order of 800–1200° C.

References Cited by the Examiner

UNITED STATES PATENTS

| | | | |
|---|---|---|---|
| 2,708,255 | 5/55 | White | 148—1.5 |
| 2,958,936 | 11/60 | Meyer-Hartwig | 29—182.5 |
| 2,994,810 | 8/61 | Gudmundsen | 148—1.5 |

CARL D. QUARFORTH, *Primary Examiner.*

REUBEN EPSTEIN, *Examiner.*